United States Patent [19]

Frattinger et al.

[11] Patent Number: 5,204,131
[45] Date of Patent: Apr. 20, 1993

[54] PROCESS FOR PREPARING COOKIES AND COOKIES RESULTING FROM SUCH PROCESS

[75] Inventors: Dean J. Frattinger, Saskatoon; Tim Frattinger, Hague, both of Canada

[73] Assignee: Archer Foods Ltd., Saskatchewan, Canada

[21] Appl. No.: 650,581

[22] Filed: Feb. 5, 1991

[30] Foreign Application Priority Data

May 28, 1990 [CA] Canada .................. 2017611

[51] Int. Cl.⁵ ............................ A21D 15/06
[52] U.S. Cl. ................... 426/243; 426/549; 426/576; 426/622
[58] Field of Search ........... 426/94, 549, 242, 243, 426/524, 558, 576, 622

[56] References Cited

U.S. PATENT DOCUMENTS

| | | | |
|---|---|---|---|
| 3,649,304 | 3/1972 | Fehr, Jr. et al. | 426/128 |
| 4,693,899 | 9/1987 | Hong et al. | 426/242 |
| 4,873,098 | 10/1989 | Banks et al. | 426/94 |
| 4,911,939 | 3/1990 | Lou et al. | 426/243 |

FOREIGN PATENT DOCUMENTS

| | | | |
|---|---|---|---|
| 892506 | 2/1972 | Canada | 99/119 |
| 994162 | 8/1976 | Canada | 99/119 |
| 1099144 | 4/1981 | Canada | 99/119 |
| 1186174 | 4/1985 | Canada | 99/119 |
| 1190793 | 7/1985 | Canada | 99/119 |
| 1197411 | 12/1985 | Canada | 99/119 |
| 1237326 | 5/1988 | Canada | 99/119 |
| 1267807 | 4/1990 | Canada | 99/119 |

OTHER PUBLICATIONS

Copson, D. 1962. Microwave Heating. Avi Publishing Co., Westport, Connecticut, p. 382.
Nestle Foods Brochure 1988 Edition p. 5 (last page).

*Primary Examiner*—Jeanette Hunter
*Assistant Examiner*—Helen Pratt
*Attorney, Agent, or Firm*—Cushman Darby & Cushman

[57] ABSTRACT

A process and product of making cookies that can be baked in a microwave oven to provide a cookie with a soft chewy texture. The composition contains a flour with a high gluten ratio, such as hard spring wheat flour together with a stabilizer such as gelatin to retain moisture during baking in a microwave oven.

6 Claims, No Drawings

PROCESS FOR PREPARING COOKIES AND COOKIES RESULTING FROM SUCH PROCESS

This invention relates to a dough used for making cookies, a process for preparing cookies and cookies resulting from such process.

The object of this invention is to provide a dough which can be baked in a microwave oven to provide a cookie with a soft chewy texture.

Fresh, home baked cookies have a desirable soft and chewy texture. It has not previously been possible to duplicate the soft and chewy texture in a microwaveable dough.

Conventional dough when baked in a microwave oven results in rock hard cookies because of the effectiveness of the microwaves in driving off water throughout the dough. The lack of technology to provide a soft and chewy texture is for example, referred to in *Nestle Tollhouse American Dough Guide* 1988 Edition.

In accordance with this invention a soft chewy cookie is provided by using a flour with a high gluten ratio, such as hard spring wheat flour, to give a stretchy unbaked product which will retain sufficient water as the dough rises during baking in a microwave oven to prevent the interior of the cookie from hardening. A stabilizer such as gelatin is furthermore used to assist in retaining the moisture during baking in a microwave.

A wide range of cookie ingredients normal to cookies such as sugar, flour, water and butter or shortening and flavours may be used. Additional additives such as raisins, nuts, chocolate chips, may be included if desired as part of such cookie ingredients. What is important in accordance with this invention is that a high gluten flour be employed, such as hard spring wheat from Saskatchewan, with a high protein level of 13 to 19%; as opposed to soft spring wheat which has a maximum protein level of 9%. Flour should be present in a percentage of about 12.00 to 35.00 of the dough.

The water added to the mix should be in the range 3% to 8% and preferably 5 to 7%.

It is also important to add a stabilizing agent to help retain the water during baking in the microwave. It is needed to bind free water and prevent large crystal formation during freezing. It contributes to the smooth texture that is a desirable objective and is normally found in a high fat content product. Gelatin is the preferred stabilizer. Other stabilizers are agar, locust bean gum, guar gum, algins, carrageenans, cellulose gums. The gelatin or other stabilizer should be present in the percentage of about 0.25 to 1.25 of the dough.

This invention will be further illustrated by the following examples. It will be appreciated that modifications may be made within the skill of those engaged in the culinary and baking arts without departing from the scope of this invention.

EXAMPLE 1

1) Scale all ingredients, namely

| Ingredient | Percent |
| --- | --- |
| Butter | 11.81 |
| Sugar, white | 8.85 |
| yellow | 13.28 |
| Eggs | 8.85 |
| Vanilla | .74 |
| Water | 5.90 |
| Gelatin | .74 |

-continued

| Ingredient | Percent |
| --- | --- |
| Color (Natural) | .37 |
| Flour | 31.00 |
| Baking Powder | .37 |
| Salt | .37 |
| (secondary ingredients, e.g. chocolate chips) | 17.72 |
| | 100.00 |

(a) The butter which should preferably be 100% pure butter, but which may alternatively be shortening, is placed in a mixing kettle and creamed for about 2 minutes until slightly fluffy and smooth in texture. Butter not only makes a richer tasting cookie, it also does not separate during mixing.

A suitable mixing kettle is a Model DN/TA200 stainless available from Groan. It has a bowl of 200 gallon capacity and includes scraping fingers that force ingredients off the sides of the mixing bowl to the center. Propeller blades force ingredients up the sides of the kettle so that ingredients do not remain unmixed at the bottom of the kettle. There is also a secondary mixing blade which blends all the ingredients in the center of the kettle.

(b) The sugars and gelatin are separately blended and the blend is added to the mixing kettle where they are creamed with the butter that has previously been added for a rotation time of about 2 or 3 minutes. At this time the appearance should be smooth and not significantly fluffy. Blend no longer than four minutes. If the butter, sugars and gelatin are creamed too much the product becomes too light which produces a hard brittle cookie when baked in a microwave. If creamed too little, the product ingredients will be insufficiently mixed and the cookie will not rise properly when baked, with the result that the product has a granular texture.

(c) Liquid ingredients and eggs (if used) are then added. Then flavor, honey and molasses are added and blended for a rotation time of about one minute. It is preferred first to add the eggs and mix for a rotation time of about 2 minutes maximum to cream to a thick texture. The blended mixture will have a thick slurry texture. Then add water and blend for 15 seconds or until incorporated.

(d) Separately, blend the dry ingredients, namely, flour, baking powder as a leavening agent, and color and add to the creamed mixture in the kettle and blend for about 2 minutes at a slow speed. This is about three-quarters of the time required for complete mixing.

(e) Add any secondary ingredients such as raisins, chocolate chips, nuts, and complete blending for about 40 seconds at a slow speed.

The dough produced will be stretchy to allow the cookie to rise quickly when microwaved and yet still trap the water inside.

The dough may then be baked in a microwave as described below in Example 2, or may be frozen if not to be used for a substantial period of time.

EXAMPLE 2

The dough described in Example 1 is passed through a cookie maker to a thickness of about 1.9 cm, and formed into discs each weighing about 21 grams and having a diameter of about 4.5 cm. A batch, of 3 or 4 such discs, is placed on a silicon parchment paper and placed on a microwaveable plate and baked in the microwave for 85 to 110 seconds at full power of 700 watts.

If the dough is frozen the recommended time in the microwave is 110 to 140 seconds at 700 watt power. If the microwave is at less power the baking time will vary proportionally. The product has a soft, chewy, fresh, home baked texture.

We claim:

1. A method of making a cookie having a soft chewy texture similar to that of home baked cookies comprising the steps of:
 1) creaming butter or shortening with sugars and a stabilizing agent for a time which is sufficient to provide a smooth texture indicative of adequate mixing;
 2) adding liquid ingredients including water in the range of from 3% to 8% to provide a selected moisture content;
 3) adding blended dry ingredients including high gluten flour having a protein level of 13 to 19% and blending to make a stretchy dough to allow the cookie to rise quickly when microwaved and yet still trap the water within the dough;
 4) freezing the dough;
 5) baking the frozen dough in a microwave oven to form said cookie.

2. A cookie dough as in claim 1, in which the high gluten flour is hard spring wheat flour.

3. A cookie dough as in claim 1, in which the stabilizer is gelatin.

4. A cookie dough as in claim 1, in which the percent of high gluten flour in the cookie dough is 12 to 35%.

5. A cookie dough as in claim 1, in which the percent of stabilizer in the cookie is 0.25 to 1.25 %.

6. A cookie made by the process of claim 1.

* * * * *